United States Patent [19]

Maida et al.

[11] Patent Number: 4,600,289

[45] Date of Patent: Jul. 15, 1986

[54] APERTURE CONTROL SYSTEM FOR CAMERAS

[75] Inventors: Osamu Maida, Tokyo; Akira Katayama, Koganei, both of Japan

[73] Assignee: Nippon Kogaku K. K., Tokyo, Japan

[21] Appl. No.: 648,246

[22] Filed: Sep. 7, 1984

[30] Foreign Application Priority Data

Sep. 19, 1983 [JP] Japan ................................. 58-172560

[51] Int. Cl.[4] .......................... G03B 7/085; G03B 7/20
[52] U.S. Cl. ..................................... 354/448; 354/455
[58] Field of Search ............................... 354/441–444, 354/448, 455, 271.1

[56] References Cited

U.S. PATENT DOCUMENTS

| 3,987,460 | 10/1976 | Ueda et al. | 354/448 |
| 4,179,202 | 12/1979 | Fukuhara | 354/448 |
| 4,307,948 | 12/1981 | Kitamura et al. | 354/448 |
| 4,429,973 | 2/1984 | Kawasaki et al. | 354/271.1 |
| 4,477,161 | 10/1984 | Kawasaki et al. | 354/448 |

Primary Examiner—William B. Perkey
Attorney, Agent, or Firm—Shapiro and Shapiro

[57] ABSTRACT

An aperture control system comprises compensating means for actuating an electromagnetic latch mechanism at an earlier time to compensate errors in controlled aperture values due to the mechanical time delay in the electromagnetic latch mechanism, and means for setting a compensated amount in the compensating means in accordance with the error in a controlled aperture value for each interchangeable lens.

4 Claims, 8 Drawing Figures

APERTURE CONTROL SYSTEM FOR CAMERAS

BACKGROUND OF THE INVENTION

1. Field of the Invention

The present invention relates to a system for controlling the aperture in a camera, and particularly to an aperture controlling system which can electromagnetically control the movement of aperture blades to obtain the desired aperture value.

2. Description of the Prior Art

There is known a camera containing an automatic aperture control mechanism which electromagnetically controls the aperture for an objective lens, the automatic aperture control mechanism being actuated in shutter speed priority mode or program mode to control the exposure. In the general single-lens reflex cameras, such mode control is made in accordance with one of two following photometric methods. One of these photometric methods is the full aperture metering system in which when the aperture is automatically controlled in the shutter speed priority mode, the shutter will be actuated at a manually preset shutter speed and the aperture will be controlled to provide a proper exposure corresponding to the preset shutter speed. If the controlled aperture value is improper, the proper exposure cannot be obtained when the automatic aperture control is made in the shutter speed priority mode. In accordance with the other metering system, an aperture value providing a proper exposure corresponding to the manually preset shutter speed is computed. The aperture is then controlled into the computed aperture value. The shutter is operated at a shutter speed to provide the proper exposure based on the amount of light passed through the controlled aperture. If the controlled aperture value agrees with the computed value, therefore, the same shutter speed as the preset shutter speed is reproduced to effect the control in the shutter speed priority mode. If the controlled aperture value is not consistent with the computed value, the shutter is actuated at the shutter speed providing the optimum exposure corresponding to that aperture value so that the desired exposure can be attained. Since this shutter speed is different from the preset shutter speed, however, such an operation mode is not exactly the shutter speed priority mode. This holds true of the program mode.

The improper control of the controlled aperture value into the computed value in the automatic control system results from time delay in the latching operation of an electromagnetic latch mechanism in the aperture control system. Error due to this time delay can be eliminated by adjusting the latch mechanism to provide an electric latch signal at an earlier time if the aperture to be latched is constantly operated with the passage of time.

In interchangeable lens cameras, however, the aperture mechanisms for the interchangeable lenses are different from one another in spring load and inertia load. Since the characteristics in the aperture mechanisms are transmitted to the aperture latching mechanism in the camera, the variable characteristic of the aperture value relative to the passage of time will be different from one interchangeable lens to another. It is thus very difficult to provide a properly controlled aperture value for each interchangeable lens by the fact that the relationship between the time delay in the electromagnetic latch mechanism and the variable characteristic of the aperture value relative to the passage of time is variable.

SUMMARY OF THE INVENTION

It is therefore an object of the present invention to provide an aperture control system comprising an improved aperture latch mechanism which can be compensated with respect to error due to time delay for each interchangeable lens to always provide an exactly controlled aperture value.

The present invention provides an aperture control system comprising compensating means for actuating an electromagnetic latch mechanism at an earlier time to compensate errors in controlled aperture values due to the mechanical time delay in the electromagnetic latch mechanism, and means for setting a compensated amount in said compensating means in accordance with the error in a controlled aperture value for each interchangeable lens.

DESCRIPTION OF PREFERRED EMBODIMENTS

The present invention will now be described with reference to some embodiments in which the present invention is applied to an automatic aperture control type camera operated in the shutter speed priority mode in accordance with the full aperture metering system.

Figure 1:
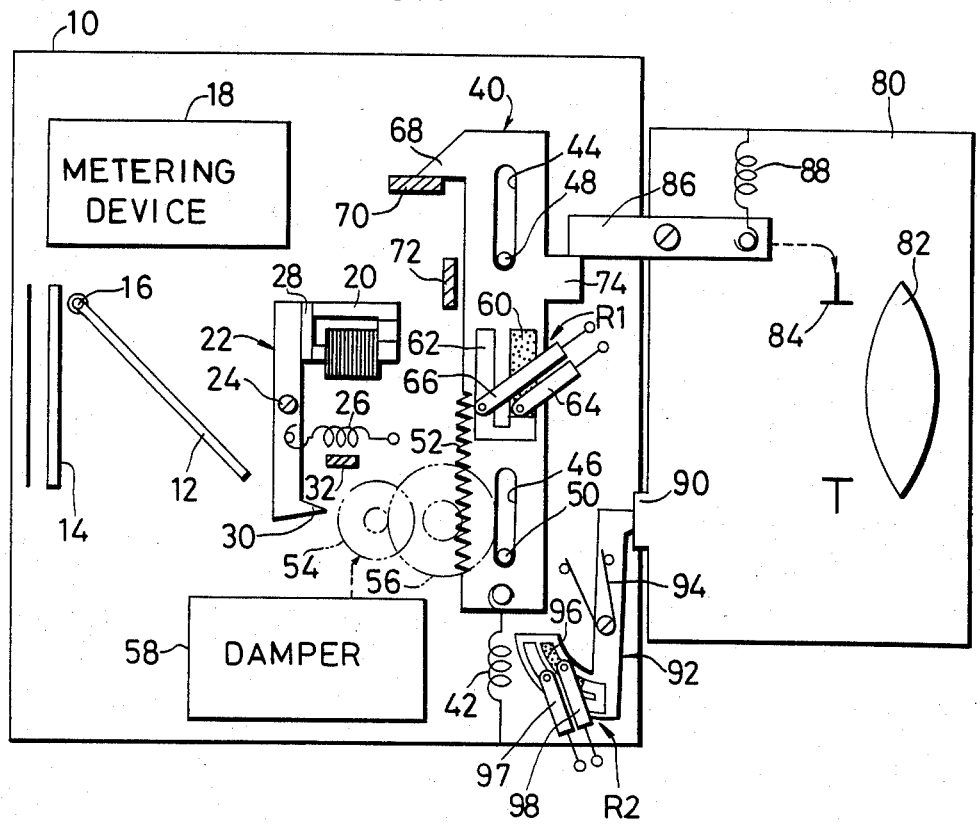
FIG. 1 is a schematic view showing an aperture controlling mechanism of a single-lens reflex camera in accordance with the first embodiment of the present invention.

Referring now to FIG. 1, there is shown a single-lens reflex camera which comprises a camera body 10 containing a shutter 14. In front of the shutter 14 there is provided a reflection mirror 12 which is pivotable upwardly about a shaft 16. A beam of light passed through an objective lens is conducted to a viewfinder through a metering device 18 and a penta-prism (not shown).

The camera also comprises an electromagnet 20 which is magnetically biased by a permanent magnet. If its coil is not energized, the electromagnet has a magnetic attraction provided by the permanent magnet. If the coil is energized, a magnetic force produced therefrom overcomes the magnetic bias to nullify the attraction.

The camera further comprises a latch lever 22 biased counter-clockwise about a shaft 24 by means of a spring 26. The latch lever 22 includes a magnetic member 28 mounted thereon at one end and which is adapted to be attracted by the electromagnet 20, and a stop pawl 30 formed on the other end of the latch lever 22. The illustrated state of the camera is prior to photographing in which the magnetic member 28 remains attracted by the electromagnet 20.

The camera further comprises a reset plate 32 transversely movable to rotate the lever 22 clockwise into contact with the magnet 20. After the lever 22 has been held by the magnet 20 under magnetic action, the reset plate 32 returns to its original position shown in FIG. 1.

The camera further comprises a control plate 40 downwardly urged under the action of a spring 42. The control plate 40 includes straight guide slots 44 and 46 formed therein which respectively receive guide pins 48 and 50 such that the control plate 40 will make its necessary linear and downward movement. The control plate 40 also is provided with a rack portion 52 operatively connecting with a multiplying gear train (54, 56) which transmits the multiplied motion of the control plate 40 to a final gear 54. The rotational speed of the final gear resulting from the motion of the control plate 40 is appropriately braked by a damper 58 to provide a relatively steady speed. The control plate 40 further includes a variable resistance R1 consisting of a resistor 60, a conductor 62 and brushes 64, 66. The variable resistance R1 is adapted to electrically detect the movement of the control plate 40. The control plate 40 further includes a latching pawl 68 formed therein at the end, which is engaged by a stopper 70 in the illustrated state of the camera. The stopper 70 will leftwardly be moved as the photographing operation is initiated.

The camera further comprises another reset plate 72 which may upwardly be moved and engage the control plate 40 to move it upwardly on completion of the photographing operation.

The control plate 40 is further provided with a transmission pawl 74 for controlling the aperture value of a lens.

The camera further comprises an interchangeable lens barrel 80 containing an objective lens 82 and an aperture 84. The lens barrel 80 is detachably mounted on the camera body 10 through a known lens mount (not shown).

The camera further comprises an aperture control lever 86 which is urged counter-clockwise into engagement with a transmission pawl 74 under the action of a spring 88. Thus, the control lever 86 follows the motion of the transmission pawl 74. The motion of the lever 86 is transmitted to the aperture 84 such that an aperture value on exposure will be determined depending on the position of the lever 86. In the illustrated position, the aperture 84 is set at maximum aperture opening which may be decreased as the control lever 86 is rotated counter-clockwise.

Adjacent to the connection of the lens barrel with the camera body there is provided a signal projection 90 extending toward the camera body 10 by an amount indicative of the characteristic inherent in each interchangeable lens relating to its aperture control, which will be described hereinafter. On the other hand, the camera body 10 has a detection lever 92 adapted to engage this signal projection 90 in the lens barrel 80. The detection lever 92 is pivotally biased clockwise under the action of a spring 94.

When the lens barrel 80 is mounted on the camera body 10, the detection lever 92 is engaged by the signal projection 90 to hold the lever 92 at a position which is determined by the extended length of the signal projection 90.

The other end of the lever 92 supports a variable resistance R2 consisting of a resistor 96 and slides 97, 98.

The control of the aperture will be made in the following manner.

When a release button (not shown) is depressed, the stopper 70 is moved leftwardly to initiate the downward movement of the control plate 40. At the same time, the mirror 12 is rotated counter-clockwise through a mechanism (not shown). The motion of the control plate 40 is multiplied by the gear train (56, 54) and at the same time controlled by the damper 58 such that the variation of the aperture value relative to time will remain relatively linear. As the control plate 40 is being moved, the controlled aperture value is converted into the varying output of the variable resistance R1 which is in turn detected. If the resistive value reaches a predetermined level, the electromagnet 20 is then energized to pivot the latch lever 22 counter-clockwise. The latch pawl 30 thereof then engages one of the teeth on the outer periphery of the gear 54 to stop the movement of the control plate 40. During the movement of the control plate 40, the aperture control plate 86 follows the transmission pawl 74 to close the aperture 84 into a predetermined level. When the mirror 12 is lifted to a predetermined position wherein the control of the aperture is completed, the shutter 14 is then moved to provide an optimum exposure to a film. When the motion of the shutter is terminated, the mirror is returned to its original position. The lever 22 and control plate 40 are then reset at their original positions by means of the reset plates 32 and 72. Consequently, the aperture 84 also is returned to its original position, that is, its maximum opening.

Figure 2:
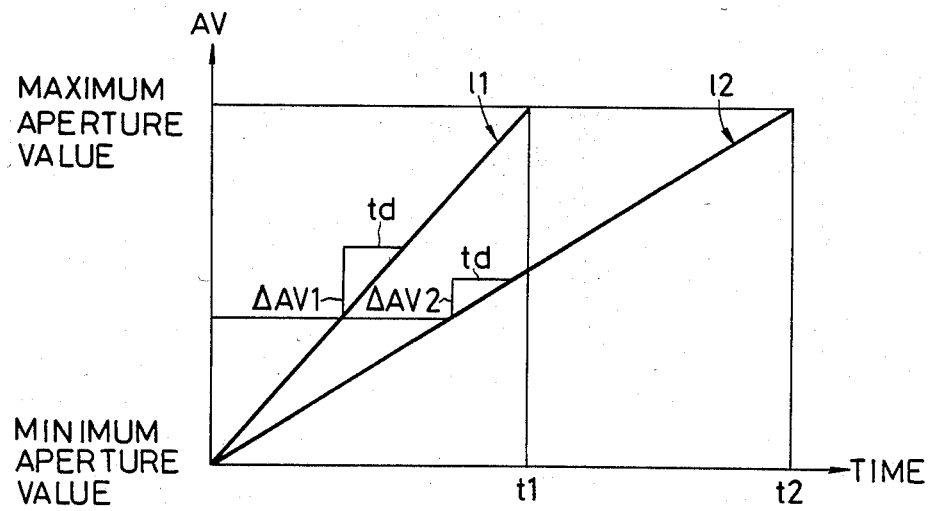
FIG. 2 is a graph illustrating the variable characteristic of an aperture value relative to the passage of time.

Referring now to FIG. 2, the variation of the aperture value relative to the passage of time in each interchangeable lens will be described below.

In the graph of FIG. 2, an axis of ordinate shows the aperture value varying with the movement of the control plate 40 while an axis of abscissa represents the passage of time from the initiation of movement of the control plate 40. A straight line 11 shows the variation of the aperture value where both the springs 42 and 88 contribute to the movement of the control plate 40. Another straight line 12 shows the variation of the aperture value where the control plate 40 is moved mainly under the action of the spring 42 substantially with or without the action of the spring 88. Under such conditions, the maximum aperture value (minimum aperture opening) is attained at times t1 and t2, respectively. The difference between the lines 11 and 12 is for the following reason: The force produced by a spring 88 is normally different from one interchangeable lens to another. The inertia mass of the aperture control members including the aperture control lever 86 and aperture 84 is also different from one interchangeable lens to another. If the inertia mass is larger and the force produced by the spring 88 is smaller, therefore, the aperture control lever 86 will be moved at a speed smaller than that of the control plate 40 under the action of the spring 42. When the control plate 40 is initiated to move, there will be produced a gap between the lever 86 and the pawl 74. As a result, the driving force from the spring 88 is not transmitted to the control plate 40. In such a manner, the variable characteristic of the aperture value will be established only under the influence of the spring 42 as shown by the line l2 in FIG. 2. In such a case, time until the minimum aperture opening is accomplished becomes maximum.

Where the lever 86 follows the pawl 74, that is, even if the driving force produced by the spring 88 is transmitted to the control plate 40 through the lever 86 and pawl 74, the aperture value varies similarly as shown by the line l2 if the driving force from the spring 88 is negligible relative to that of the spring 42.

If the force of the spring 88 is sufficiently large and the inertia mass in the lens aperture control members is smaller, the lever 86 will positively follow the movement of the pawl 74. Also, if the driving force of the spring 88 has a substantial percentage relative to that of the spring 42, these driving forces are summed. Therefore, the control plate 40 may be moved at a higher speed as shown by the line l1 in FIG. 2. Although the variation of the aperture value is represented by the straight lines for clarification, the actual characteristics will be represented by curves obtained from equations of higher order. However, the difference is not very essential even if the characteristics are represented by the straight lines.

In the graph of FIG. 2, time delay from the energization of the coil 20 to the latching of the control plate 40 through the gear 54 is represented by td. This time period is constant irrespective of different interchangeable lenses.

Assuming that in the characteristic shown by the line l1, the aperture control error due to time td is $\Delta AV_1$ and the aperture number of aperture closing steps until time t1 is $A_{VM}$.

$$\Delta A_{V1} = \frac{td}{t1} \cdot A_{VM} \quad (1)$$

Similarly, where in the characteristic shown by the line l2, the aperture control error is $$\Delta A_{V2} = \frac{td}{t2} \cdot A_{VM} \quad (2)$$

If all the interchangeable lenses have the same aperture control system, for example, such system as shown by the characteristics l1, the aperture value may always exactly be controlled if it is compensated by a predetermined amount corresponding to $\Delta A_{V1}$ for all the interchangeable lenses. In this case, such compensation can be made by energizing the electromagnet earlier by time td. Where the variable characteristics of the interchangeable lenses are different from one to another as shown by the lines l1 and l2, however, a single compensation will create an error in the controlled aperture value based on the different between the values $\Delta A_{V1}$ and $\Delta A_{V2}$.

Figure 3:
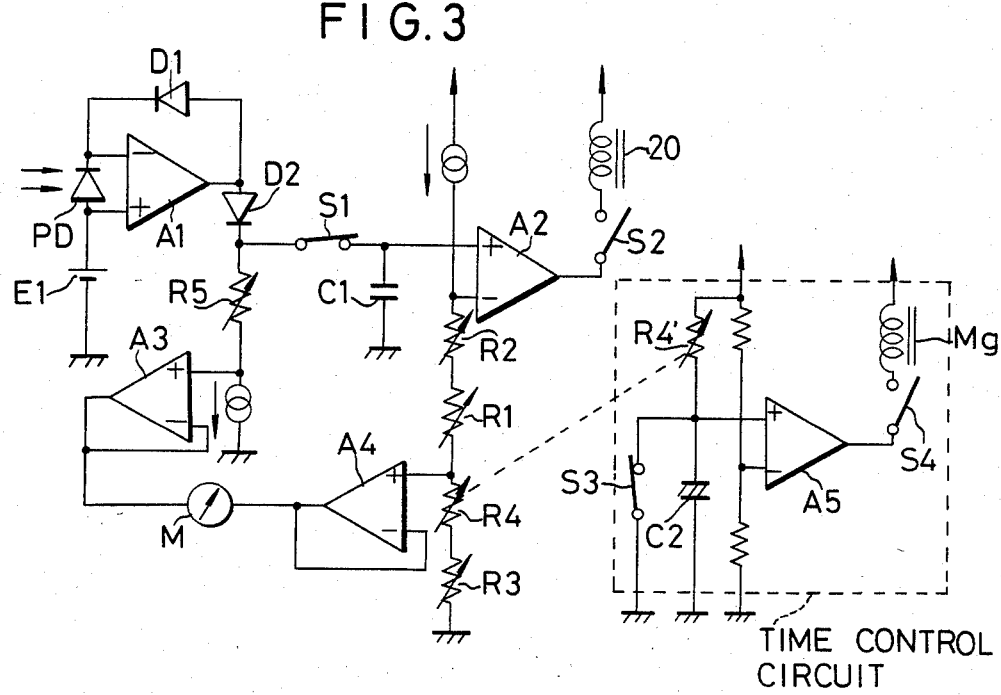
FIG. 3 is a circuit diagram showing an embodiment of the control system which is applied to the camera shown in FIG. 1.

To correct this problem, the first embodiment of the present invention includes such a circuit as shown in FIG. 3.

This circuit comprises a photometry circuit for metering light passed through the object lens 82. The photometry circuit includes a photodiode PD, an operational amplifier A1 and a logarithmic compression diode D1. The circuit also includes a biasing constant voltage source E1, a diode D2 for compensating the temperature characteristic due to the reverse saturation voltage of the diode D1 and a memory switch S1 which is in its ON state prior to the lift of the mirror 12 shown in FIG. 1. When the release button is depressed, the memory switch S1 is turned off immediately before the mirror is upwardly moved such that the output voltage of the photometry circuit is stored in a memory capacitor C1.

A comparator A2 is connected at output with the electromagnet 20 through a switch S2 which is normally open. When the release button is depressed and the stopper 70 is leftwardly moved, the switch S2 is turned on. On completion of the aperture control, the switch S2 is returned to its OFF state. In other words, the electromagnet 20 is allowed to be energized only during time period in a sequence for which the control of aperture is allowed.

The circuit further comprises a variable resistance R3 which can be set at any value through an information setting member (not shown) outside the camera, this set value being compatible with the sensitivity of a film used.

The circuit further comprises a variable resistance R4 which can be set at any value through an information setting member (not shown) outside the camera, the set value being compatible with a preset shutter speed.

The variable resistance R1 of FIG. 1 is connected in series with the variable resistances R3 and R4. The value of the variable resistance R1 increases as the aperture opening decreases.

The variable resistance R2 of FIG. 1 is connected in series with the resistance R1. The value of the variable resistance R2 is set higher when the lens barrel having the characteristic l1 is mounted on the camera body rather than the characteristic l2 (FIG. 2).

There is further provided a variable resistance R5 which is adapted to compensate a deviation in the indication (in a voltage meter which will be described hereinafter) due to the difference between aperture openings in different interchangeable lenses. The variable resistance R5 is normally automatically set when an interchangeable lens is mounted on the camera. If the brightness in an object is constant, therefore, the output voltage of a follower amplifier A3 becomes constant irrespective of the different open aperture values of the interchangeable lenses mounted in the camera. A follower amplifier A4 generates a voltage depending on the resistances R3 and R4. There is provided a voltage meter M which has an indicator moved depending on the difference of output voltage between the amplifiers A3 and A4. This indicator is normally visible in the viewfinder of the camera. The indication pointed out by the indicator is a value at which the aperture is to be controlled.

The circuit further comprises a shutter speed control circuit which includes a variable resistance R4' operatively associated with the variable resistance R4 with the value thereof being varied depending on different preset shutter speeds in the camera. The shutter speed control circuit also includes a trigger switch S3 for providing a timing at which the shutter speed begins to be counted in time. This count is initiated when the trigger switch S3 is closed on initiation of the motion of the leading curtain in the shutter. The shutter speed control circuit further includes a switch S4 which is turned on when the release button is depressed, and a magnet Mg which is energized to hold the trailing curtain of the shutter when a comparator A5 produces its output at "L" level. After the passage of a predetermined time period, the output of the comparator A5 becomes the "H" level to de-energize the magnet Mg so that the trailing curtain of the shutter will move to expose the film. On completion of the motion of the shutter trailing curtain, the switch S4 is turned off. This is maintained until the release button is again depressed.

The operation is as follows:

When the release button is depressed, the switch S1 is turned off prior to the initiation of upward movement of the mirror 12 and the luminance value in an object is stored in a capacitor C1. At the same time, the control plate 40 begins to move and the switch S2 is turned on as hereinbefore described. The movement of the control plate 40 increases the value of the resistance R1. As the voltage in the negative input terminal of the comparator A2 becomes equal to the voltage of the capacitor C1, the output of the comparator A2 is changed from the "H" level to the "L" level so that the magnet 20 is energized to actuate the electromagnetic latch mechanism shown in FIG. 1. This will latch the control plate 40.

More particularly, the value of the resistance R1 corresponds to the difference between the minimum aperture value and a controlled aperture value in the objective lens. Thus, information inputted to the resistance R1 may be indicated by APEX notation, $(A_V - A_{V0})$ where $A_V$ represents the aperture value controlled by the control plate 40. The information stored in the capacitor C1 is the difference $(B_V - A_{V0})$ between the luminance value $B_V$ in the object and the minimum aperture value $A_{V0}$. The information set at the resistances R3 and R4 includes the film sensitivity $S_V$ and the shutter speed $T_V$. The information set at the resistance R2 is indicative of the value $\Delta A_V$ obtained from time td shown in FIG. 2. Accordingly, when the output of the comparator A2 is changed from the "H" level to the "L" level, the relationship is satisfied by:

$$(B_V - A_{V0}) = \Delta A_V + (A_V A_{V0}) + T_V - S_V \ldots \quad (3)$$

When the electromagnet 20 is energized, thus, the value A is obtained from the above formula (3) as follows:

$$A_V = B_V + S_V - T_V - \Delta A_V \ldots \quad (4)$$

If the extended length of the projection 90 in a lens barrel is compatible with the characteristic inherent in that lens barrel, that is, if it is determined to provide the value $\Delta A_{V1}$ to the resistance R2 for the lens barrel having the characteristic 11, the electromagnet 20 will be energized earlier by an amount of time corresponding to the error $\Delta A_{V1}$ in the time delay td. In such a manner, a proper aperture opening will be obtained when the motion of the aperture is actually stopped after the passage of a mechanical time delay (corresponding to td). As a result, $$A_V = B_V + S_V - T_V \ldots \quad (5)$$

Since the value $T_V$ in the formula (5) is controlled by the resistance R4, an optimum exposure may be obtained in the shutter speed priority mode.

The variable resistance R2 can manually be set depending on the known characteristic of an interchangeable lens. In such a case, it is only necessary to provide a switching dial for externally operating the resistance R2 on the outside of the camera body 10.

Figure 4:
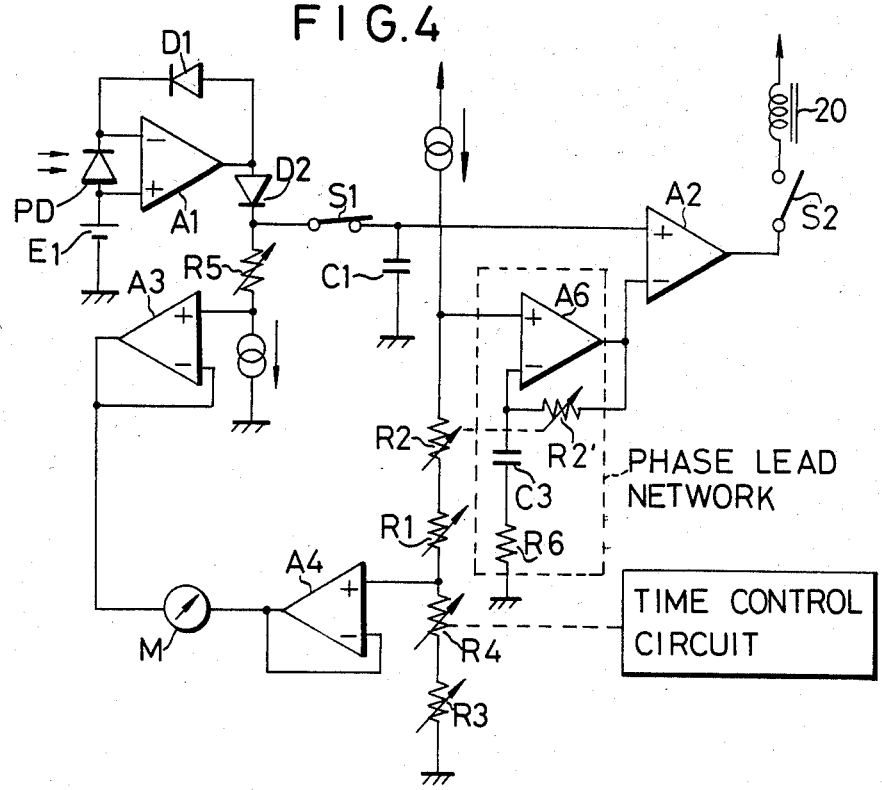
FIG. 4 is a circuit diagram showing another embodiment of the control system which is applied to the camera shown in FIG. 1.

FIG. 4 shows a circuit which is the other embodiment of the present invention. The embodiment shown in FIG. 4 is characterized by that it includes a phase lead network in addition to the components in the embodiment of FIG. 3. The phase lead network has its input and output voltages equal to each other when DC input voltage is applied to the positive input terminal of an operational amplifier A6. As the input voltage varies with the passage of time, the output voltage of the phase lead network will be the input voltage plus a voltage determined by a variable resistance R2', a capacitor C3 and a resistance R6. This summed voltage increases as the rate of varying input voltage with the passage of time increases. The resistance R6 is adapted to limit the frequency band of the phase lead network. If the frequency band of the network is broader than an actually used frequency band, an erroneous operation due to the thus produced noise can be prevented by the resistance R6. If the input voltage linearly varies with the passage of time, the voltage added to the input voltage increases as the resistance R2' is increased. The resistance R2' is operatively associated with the resistance R2 which is adapted to make a stationary compensation depending on the characteristic of a lens barrel used as described with reference to FIG. 3. This means that the phase lead network automatically compensates the characteristic of the aperture control when it is different from the linear characteristic as shown in FIG. 2. In other words, an optimum controlled value will be obtained by the combination of the stationary compensation in the resistance R2 with the dynamic compensation in the resistance R2'.

The operation is as follows: The resistances R2 and R2' are set depending on the characteristic inherent in the lens barrel of an interchangeable lens used. When the release button is depressed, the control plate 40 is moved to increase the resistance R1. As a result, the positive input terminal voltage of the operational amplifier A6 is increased. The output voltage of the operational amplifier A6 is increased with the increase of the input voltage. When that output voltage becomes larger than the input voltage, the comparator A2 is inverted to energize the electromagnet 20 and then to latch the control plate 40. Even if the variation of the aperture value with the passage of time is not linear and when the rate of change increases with the passage of time, the phase lead network may generate an aperture latch signal earlier to exactly control the aperture.

All the embodiments described hereinbefore are applied to a camera of such a type that the aperture can automatically be controlled in the shutter speed priority mode in accordance with the metered exposure in the full aperture. Accordingly, the camera is provided with a servo mechanism which electrically detects the displacement of the aperture control plate moved under the action of spring means and then stops the motion of the aperture control plate in accordance with the detected output.

There will now be described the other embodiment of the present invention in which when the amount of light passed from an object through an aperture being closed is decreased to a predetermined level, the closing is stopped to provide an amount of light which is used to reset the shutter speed. In other words, this embodiment provides a camera of such a type that executes the automatic aperture control in the shutter speed priority based on TTL light intensity feed-back metering. In this type camera, a servo mechanism for stopping the motion of the aperture control plate is operated depending on the variation of the light passed through the aperture without need of the variable resistance R1 shown in FIG. 1.

Figure 5:
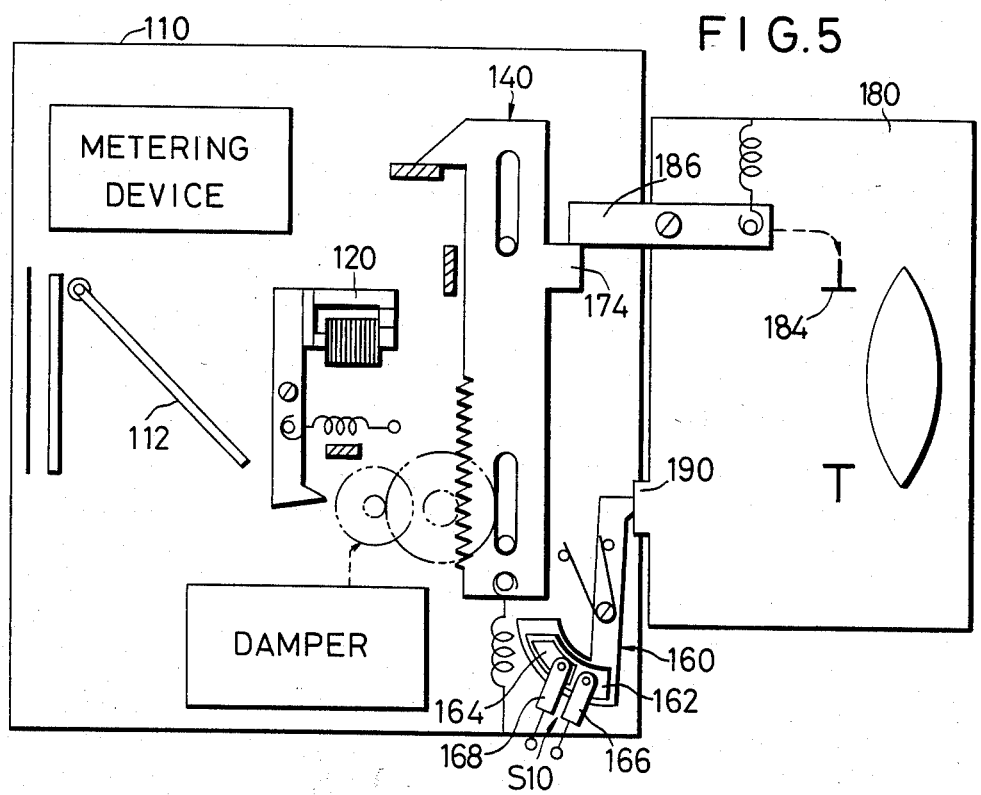
FIG. 5 is a schematic view showing an aperture control mechanism of a single-lens reflex camera in accordance with the second embodiment of the present invention.

FIG. 5 shows a camera 110 comprising a reflection mirror 112 which is adapted to upwardly move after the aperture has been controlled by an aperture control plate 140. The camera also comprises a detection lever 160 displaced by the projection 190 of a lens barrel 180. The detection lever 160 includes an insulation coating layer 162 and a conductive coating layer 164 which define an ON-OFF switch S10 with slides 166 and 168.

Figure 6:
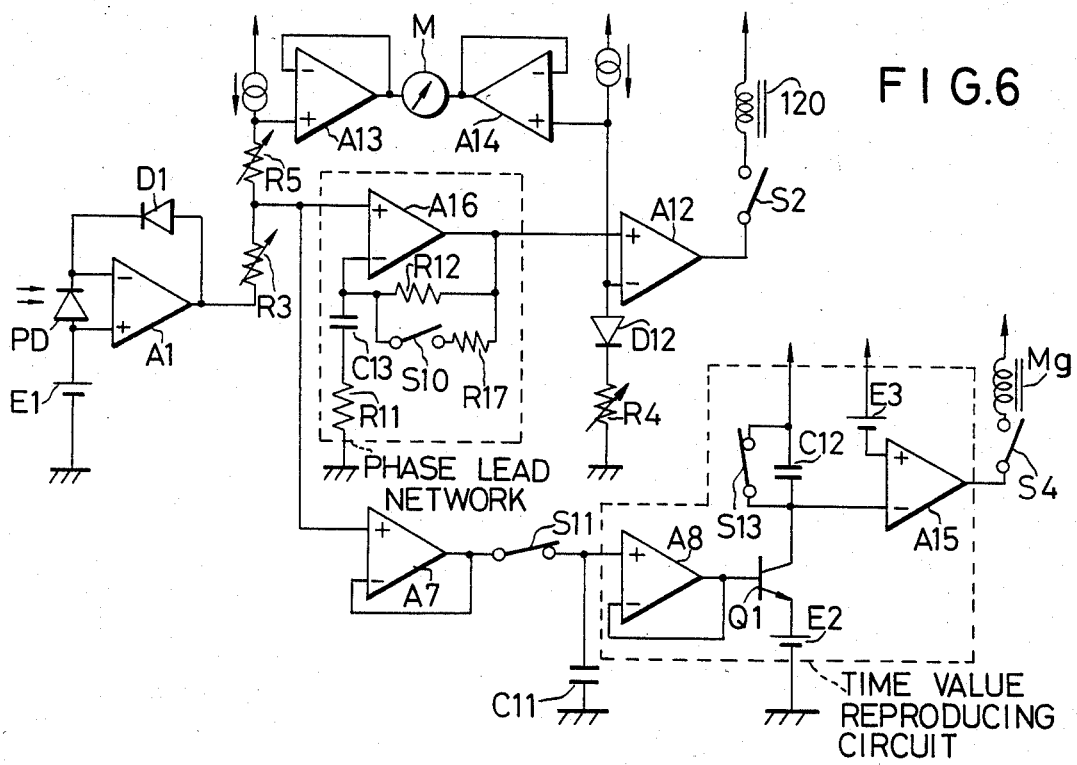
FIG. 6 is a circuit diagram showing an embodiment of the control system which is applied to the camera shown in FIG. 5.

The camera of FIG. 5 includes an electric circuit shown in FIG. 6. The circuit comprises a resistance R3 for setting information of film sensitivity, which is connected with the output of an amplifier A1 in the photometry circuit; a resistance R5 connected in series with the resistance R3 and adapted to compensate a deviation of the indication due to the difference between aperture openings in interchangeable lenses; and a resistance R4 for setting information of the shutter speed and which is connected with the negative input of a comparator A12 through a diode D12 for compensating the temperature characteristic of the diode D1. A circuit for indicating an optimum aperture value to be controlled relative to a set shutter speed is defined by amplifiers A13, A14 and a voltage motor M.

A phase lead network is constituted of an amplifier A16, a capacitor C13, resistances R11, R12 and R17, and the switching circuit S10 shown in FIG. 5. The phase lead network is connected with the junction between the resistances R3 and R5.

There is further provided a switch S11 for controlling the shutter speed in such a manner as described hereinafter. The switch S11 is turned off as the control of aperture has been completed. The output voltage of the voltage follower A7 immediately therebefore is thus accumulated in the capacitor C11. As the mirror is downwardly moved, the switch S11 is turned on.

A logarithmic expansion circuit comprises an amplifier A8, a transistor Q1 and a source of voltage E2 and a shutter speed reproducing circuit consists of a trigger switch S13 for initiating the count of the shutter speed, a capacitor C12, a source of voltage E3 and a comparator A15.

The operation is as follows: When the release button is depressed, a control plate 140 begins to move while a mirror 112 will not upwardly be moved until the control of aperture has been completed. When the opening of an aperture 184 is changed by the movement of an aperture control lever 186 following the control plate 140, light passed through the aperture is conducted to a photometry device through the mirror 112 to change the resistance in a photodiode PD. During the control of aperture, the control plate 140 is moved at such a speed that the control lever 186 necessarily contacts a transmission pawl 174.

As the aperture is being closed, the output voltage of the operational amplifier A1 decreases and also the output of the amplifier A16 in the phase lead network decreases. An operational amplifier A16 generates its output voltage smaller than its input voltage in accordance with the rate of change in that input voltage with the passage of time. When the output voltage of the operational amplifier A16 decreases to the negative input voltage of a comparator A12 depending on the set shutter speed, the output of the comparator A12 is changed from the "H" level to the "L" level to energize an electromagnet 120. Thus, the electromagnetic latch mechanism of FIG. 5 is operated to latch the control plate 140 whereat the aperture has been controlled. At this time, the switch S11 is turned off so that voltage including information with respect to an aperture value after the aperture has been controlled, film sensitivity and luminance of an object are stored in the memory capacitor C11. The stored voltage establishes the collector current of a transistor Q1 in the logarithmic expansion circuit. When the front curtain of the shutter begins to move, the switch S13 is turned off to charge the capacitor C12 with a constant current. When the charged level of the capacitor C12 reaches a reference voltage E3, the output voltage of a comparator A15 is changed from the "L" level to the "H" level to de-energize the magnet Mg for holding the trailing curtain of the shutter. As a result, the trailing curtain of the shutter is moved until the exposing operation is terminated. The shutter speed at this time is so determined that an optimum exposure value can always be provided in connection with the controlled aperture value, luminance in the object and film sensitivity. Even if there is an error in the controlled aperture value, therefore, the provision of the optimum exposure is assured.

The characteristic of the aperture varies with the passage of time. The phase lead network operates depending on the changing rate of the aperture until immediately before the output of the comparator A12 is inverted. However, the rate of change in the aperture after the output of the comparator A12 has been inverted normally increases with the passage of time during time delay until the electromagnet latch mechanism is actually operated to stop the motion of the aperture. Thus, this fact must be anticipated when the amount of compensation is adjusted.

For such a reason, there is provided a switch S10 which is turned off when an interchangeable lens having a larger rate of change relative to time, that is, the lens barrel 180 of FIG. 5 is mounted on the camera body. This causes the amount of compensation by the phase lead network (corresponding to $\Delta A_V$) to increase. If an interchangeable lens having a less variation is mounted on the camera body, the switch S10 is turned on to decrease the amount of compensation (corresponding to $\Delta A_V$).

Figure 7:
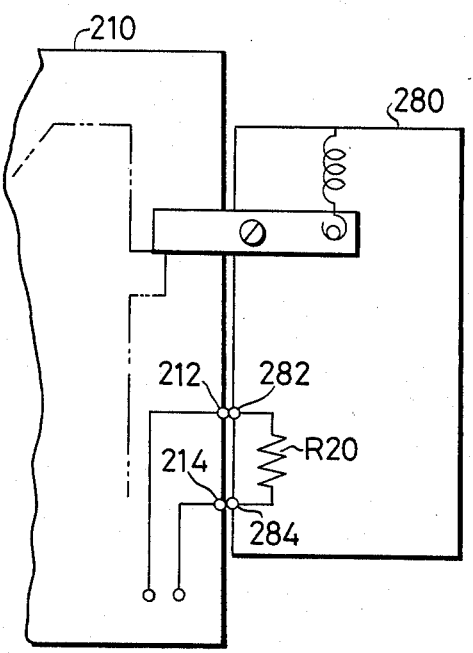
FIG. 7 is a schematic view showing a partial modification of the embodiments shown in FIGS. 1 and 5.

In the above embodiments of the present invention, the projections 90 and 190 in the lens barrel, variable resistance R2 and switch S10 may be replaced by such electrical contacts and resistances as shown in FIG. 7.

When a lens barrel 280 for an interchangeable lens is mounted on a camera body 210, contacts 212 and 214 on the camera are electrically connected with contacts 282 and 284 on the lens barrel, respectively. This causes a resistance R20 to establish a constant in the compensating circuit on the camera body, which resistance R20 is selected to have its value indicative of the characteristic relating to the aperture control inherent in that lens barrel. In other words, the resistance R2 in the circuit shown in FIGS. 3 and 4 or the resistances R12, R17 and switch S10 in the circuit of FIG. 6 are replaced by the resistance R20 to automatically set the compensation $\Delta A_V$. In the circuit of FIG. 6, it is of course that the switch S10 may be used in place of the resistance R20 by short-circuiting between the terminals 282 and 284 and by opening between the terminals 282 and 284.

It is generally known that data is transmitted between the camera body and the interchangeable lens barrel. The data indicative of the characteristics of an interchangeable lens includes minimum aperture value AVmin, maximum aperture value AVmax and focal length.

The combination of the data can cause the characteristic of the aperture control relative to time to interconnect with one another so that the compensation $\Delta A \nu$ will automatically be established.

Figure 8:
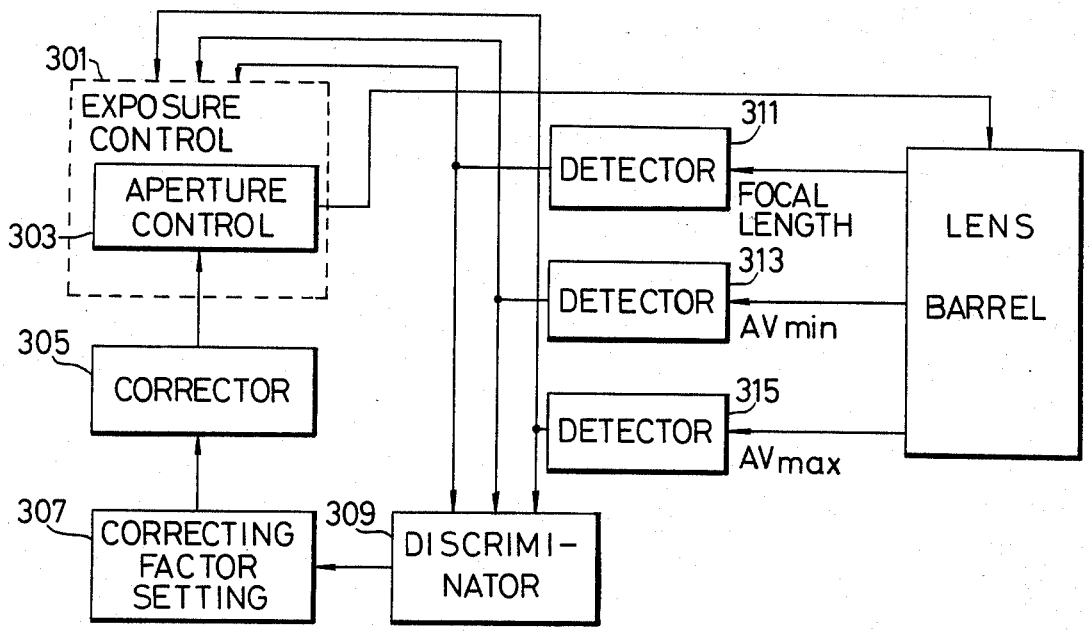
FIG. 8 is a block diagram showing the third embodiment of the present invention.

FIG. 8 shows an exposure control section 301 including an aperture control portion 303, a compensation circuit section 305, a compensation coefficient setting circuit section 307, a circuit section 309 for discriminating the characteristic of the aperture control, focal length data detecting means 311, minimum aperture value detecting means 313 and maximum aperture value detecting means 315. Information of a controlled aperture value is transmitted from the aperture control section 303 to the lens barrel which in turn supplies data of the focal length, minimum and maximum aperture values to the camera body. The combination of data from the lens barrel is interconnected with the characteristic of the aperture in the lens barrel to discriminate the characteristic of the aperture in the discriminating circuit 309 with the discriminated value being used to set a coefficient of compensation. This establishes an amount of compensation (corresponding to $\Delta A \nu$) so that an exactly controlled aperture value will be obtained.

We claim:

1. A camera of such a type that it controls an aperture drive mechanism in an objective lens to change the opening of an aperture until it reaches a predetermined aperture value, said camera comprising:
   (a) displacement means displaceable in association with said aperture drive mechanism to change said aperture opening;
   (b) means producing a monitoring output corresponding to the change of said aperture opening;
   (c) signal means provided on said objective lens and showing the characteristics of said objective lens concerning the speed of said aperture opening change when said displacement means is caused to be shifted by said aperture drive mechanism;
   (d) electric circuit means producing an electric output in response to said monitoring output; and
   (e) latch means including electromagnetic means responsive to said electric output and effective to stop the motion of said displacement means in response to said electromagnetic means;
   (f) said electric circuit means being adapted to produce said electric output earlier by a time period corresponding to time delay from the enabling of said electromagnetic means to the stoppage of said displacement means than the time in which said aperture opening is changed to said predetermined aperture value by said displacement means, and having means for regulating the timing at which said electric output is produced based on said signal means, said regulating means including phase lead circuit means receiving as input said monitoring output, the phase lead circuit means producing an output added to the monitoring output by a predetermined amount following said signal means when said monitoring output changes.

2. A camera as defined in claim 1, wherein said phase lead circuit means includes a positive input terminal receiving as an input said monitoring output, variable resistor means responsive to said signal means, a negative input terminal connected to an output terminal through said variable resistor means, and capacitor means connected to the negative input terminal.

3. A camera of such a type that it controls an aperture drive mechanism in an objective lens to change the opening of an aperture until it reaches a predetermined aperture value, said camera comprising:
   (a) displacement means displaceable in association with said aperture drive mechanism to change said aperture opening;
   (b) means providing a photometric output corresponding to quantity of light passing through said aperture opening which is being changed by said aperture drive mechanism;
   (c) signal means provided on said objective lens and showing the characteristics of said objective lens concerning the speed of said aperture opening change when said displacement means is caused to be shifted by said aperture drive mechanism;
   (d) electric circuit means producing an electric output in response to said photometric output; and
   (e) latch means including electromagnetic means responsive to said electric output and effective to stop the motion of said displacement means in response to said electromagnetic means;
   (f) said electric circuit means being adapted to produce said electric circuit earlier by a time period corresponding to time delay from the enabling of said electromagnetic means to the stoppage of said displacement means than the time in which said aperture opening is changed to said predetermined aperture value by said displacement means, and having means for regulating the timing at which said electric output is produced based on said signal means, said regulating means including phase lead circuit means receiving as an input said photometric output, the phase lead circuit means producing an output added to said photometric output by a predetermined amount following said signal means when the photometric output changes.

4. A camera as defined in claim 3, wherein said phase lead circuit means includes a positive input terminal receiving as an input said photometric output, variable resistor means responsive to said signal means, a negative input terminal connected to an output terminal through the variable resistor means, and capacitor means connected to the negative input terminal.

* * * * *